N. B. Sornborger's Syringe and Catheter.
73402
PATENTED
JAN 14 1868
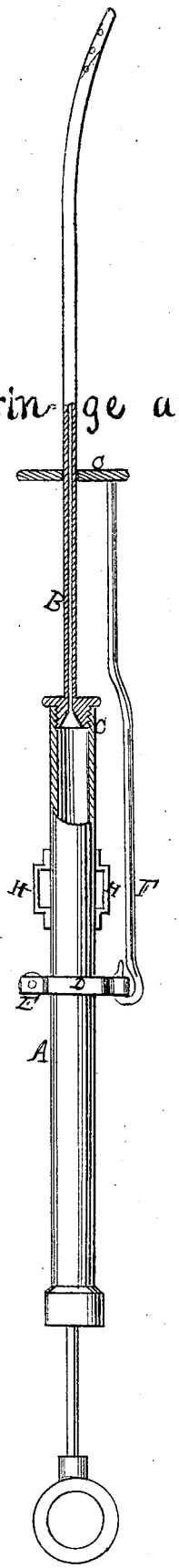
Witnesses,
Inventor,

United States Patent Office.

DR. N. B. SORNBORGER, OF NORTHAMPTON, MASSACHUSETTS.

Letters Patent No. 73,402, dated January 14, 1868.

IMPROVED COMBINED CATHETER AND SYRINGE.

*The Schedule referred to in these Letters Patent and making part of the same.*

TO ALL WHOM IT MAY CONCERN:

Be it known that I, N. B. SORNBORGER, of Northampton, in the county of Hampshire, and State of Massachusetts, have invented a new and improved Combined Catheter and Syringe; and I do hereby declare that the following is a full, clear, and exact description thereof, which will enable those skilled in the art to make and use the same, reference being had to the accompanying drawings, forming part of this specification.

The combined catheter and syringe embraced in the present invention is provided with a collar on its body or cylinder, susceptible of adjustment at pleasure, and thus, through a stem or rod connecting it with a collar arranged to slide upon the discharge-tube or passage of the syringe, enabling such collar on the discharge-tube to be adjusted to any point, according to the distance which it is required or desired for the discharge-tube to pass into the system, whereby, when used by unskillful operatives or persons, rendering it almost to cause injury to the parts of the system; and, also, the body or cylinder of the syringe is provided with loops for receiving straps, by means of which it can be fastened or strapped to the body when used as a catheter. In the accompanying plate of drawings, my improved combined catheter and syringe is illustrated, the figure being a partial side view and longitudinal section of the same.

A, in the drawings, represents the body or cylinder of the syringe, in which is arranged to move a plunger or piston, as in ordinary syringes. B, the discharge-tube to the body A, which tube is screwed into one end, C, of the same. D, a collar, arranged on outside of cylinder A, so as to be adjusted in position thereon, and being adjusted, set, or fastened by a set-screw, E, of the same. F, a rod or stem, hooked at one end in the collar D, from which, being extended along the side of the cylinder toward its end carrying the discharge-tube, it is fixed at such end in and to a collar or disk, G, arranged to slide on such tube. This collar or disk G, when the syringe is inserted in the system, acts as a stop thereto, and if properly adjusted on the discharge-tube, prevents all possibility of injury to any part or parts of the system. H, loops secured to body A of syringe, upon opposite sides thereof, to which loops or straps are to be attached for fastening the syringe in position upon the person when used as a catheter.

I claim as new, and desire to secure by Letters Patent—

The slide or collar on the body to a syringe, in combination with a collar in the discharge-tube, when the two are connected together and arranged for operation substantially as and for the purpose described.

I also claim the loops applied to the cylinder of a syringe for receiving fastening-straps, substantially as described.

DR. N. B. SORNBORGER.

Witnesses:
S. S. WRIGHT,
H. S. GERE.